Oct. 15, 1929.   B. F. AUGUSTINE   1,732,147
GAS ENGINE
Filed March 29, 1923   9 Sheets-Sheet 3

Patented Oct. 15, 1929

1,732,147

UNITED STATES PATENT OFFICE

BENJAMIN FRANKLIN AUGUSTINE, OF BUFFALO, NEW YORK, ASSIGNOR TO AUGUSTINE AUTOMATIC ROTARY ENGINE COMPANY, OF BUFFALO, NEW YORK, A CORPORATION OF NEW YORK

GAS ENGINE

Application filed March 29, 1923. Serial No. 628,471.

An object of the invention is to provide a fuel supplying means for an engine having radially arranged rotating cylinders with a series of radially arranged rotating pumps, together with controlling means intermediate the pumps and the cylinders whereby the pumps operate in succession or in conjunction to supply fuel gases to the cylinders.

Still another object of the invention is to provide a gas engine having a plurality of radially disposed cylinders with a series of independently operating pumps disposed intermediate the engine cylinders and in the same radial planes as the engine cylinders whereby said pumps can be operated from the same crank with which the pistons of the engine cylinders cooperate.

A further object of the invention is to provide an engine of the above type wherein the pistons of the pumps are connected to and operated by the connecting rod carriers for the pistons of the engine cylinders.

A still further object of the invention is to provide an engine having radially disposed cylinders wherein the intake and exhaust ports are covered by the pistons, and pumps associated with the cylinders for supplying the fuel charge to the cylinders, with a valve disk disposed between the pumps and cylinders which operates independently of the engine pistons for controlling the supply of gas to the cylinders.

Still another object of the invention is to provide a valve disk of the above character which is so constructed as to cut off each cylinder from the supply during the initial opening of the intake port thereof.

A still further object is to provide means independent of the pistons for closing the exhaust port prior to the closing of the intake port.

A still further object of the invention is to provide a gas engine having a plurality of rotating radially disposed cylinders having exhaust pipes connected thereto at one end of the engine and a fuel supply connected to the cylinders at the other end of the engine, with means whereby air may be drawn in at one end of the engine through the crank casing for cooling the parts therein, and supplied to the carburetor at the other end of the engine.

Another feature of the invention is to circulate air through the crank casing and cool the interior parts of the engine, the air taken into one end of the engine proper being passed through the crank casing and then to the carburetor, so that the air not only cools the engine, but the heated air aids in the carbureting of the fuel.

These and other objects will in part be obvious and will in part be hereinafter more fully disclosed.

In the drawings which show by way of illustration one embodiment of the invention—

Fig. 2ª is a vertical sectional view with a pump cylinder at the lowest point in its rotation, this section also being slightly diverted so as to include the air pipe;

The invention in its broadest aspects is directed to a two-cycle gas engine, and preferably one of the multiple cylinder type. Associated with the cylinders is a series of pumps for supplying a fuel charge to the cylinders. Twin cylinders are preferred, as the engine is an air cooled one, and this greatly facilitates the cooling of the cylinders. These twin cylinders may, however, be considered broadly as one cylinder, so far as handling the fuel is concerned.

The twin cylinders are provided with intake and exhaust ports which are piston controlled. In addition to the piston control of the exhaust ports, there is also a controlling member which covers the exhaust ports prior to the covering of the same by the pistons, and this aids in preventing the gases from overrunning, and in the providing of a super-charge for each engine cylinder. Twin cylinders are preferred for the pumps also 00, as this gives a larger capacity without unduly enlarging the cylinders.

The cylinders are preferably radially arranged, and the pumps are likewise arranged and disposed intermediate the twin cylinders of the engine. All the cylinders are disposed in the same radial planes, and there is one crank only associated with all the engine cylinders and pump cylinders. The connecting rods of the engine cylinders are connected to this crank by suitable self-alining bearings, and the pistons of the pumps are connected to lugs carried by these self-alining bearings. The pumps are connected to suitable ports leading to the intake ports of the engine cylinders, and these ports are in part disposed in a stationary valve disk.

The valve disk is so constructed as to cut off an engine cylinder from its supply upon the initial opening of the intake port thereof, as the piston uncovers the same. This prevents any fire in the burnt charge reaching the fuel supply.

The ports of this valve disk are so shaped and constructed that the pumps operate in succession and certain of the pumps in conjunction for supplying fuel gas to the cylinders successively. As soon as the intake port opens, a relatively small amount of the fuel gas is supplied to the engine cylinder to aid in the scavenging of the same. As soon as the exhaust port is closed, the fuel gas is supplied in greater volume and a super-charge of fuel gas is admitted to each cylinder in turn.

Referring more in detail to the drawings, the engine in which the improvements are embodied consists of a supporting case 1 which carries, as herein shown, four pairs of cylinders 2, 3, 4 and 5. These cylinders are radially disposed. Intermediate the radially disposed engine cylinders are four pairs of pumps 6, 7, 8 and 9. These pump cylinders and engine cylinders are all bolted to this casing 1 and the casing is mounted so as to rotate about a horizontal axis carrying the engine cylinders and the pump cylinders therewith. Mounted in a suitable frame structure 10 is a shaft 11 which is stationary and is provided with a crank 12. The end 13 of the crank extends into a ball bearing 14 which in turn is mounted in a disk 15. An end cap plate 16 closes the left end of the casing 1 and is provided with a central shaft 17, which shaft is bored at 18 for a portion of its length for purposes which will hereinafter more fully appear. This shaft extends through ball bearings 19 and 20 carried by the main frame 10. As the engine casing rotates, the shaft 17 is rotated and the power of the engine is taken off from this shaft 17. Mounted on the shaft 17 is a gear 21 which may be utilized for actuating the timer. Between the bearings 19 and 20 is a spacing collar 22 and a sleeve 23 threaded on to the shaft clamps the inner collars of the ball bearings so that they rotate with the shaft. The other end of the casing 1 is closed by a plate 24. This plate 24 engages a ball bearing 25, the inner ring of which is secured to the stationary shaft 11 while the outer ring of the ball bearing rotates with the engine casing. It will thus be seen that the engine casing is supported and rotates on ball bearings. The engine casing is provided with an extension which forms a housing for the valve disk 27 which controls the supply of the fuel gas to the pumps and the engine cylinders. This extension is mounted on a ball bearing 28, the inner section of which is secured to the shaft 11.

Figure 2:
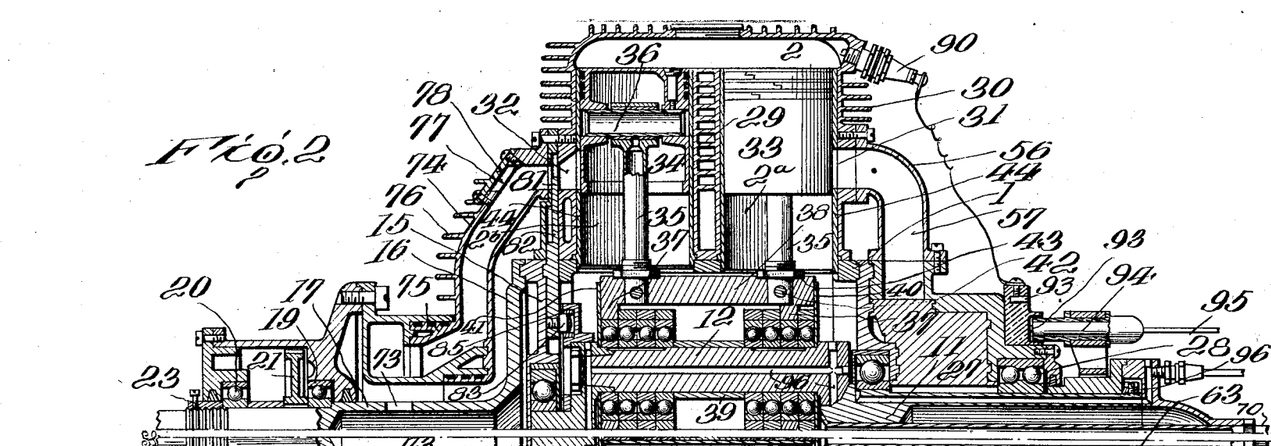
Fig. 2 is a vertical sectional view through the upper half of the engine, some of the interior parts being shown in side elevation, the section being diverted to include the air pipe through which air passes from the crank casing to the carburetor.
Figure 2A:
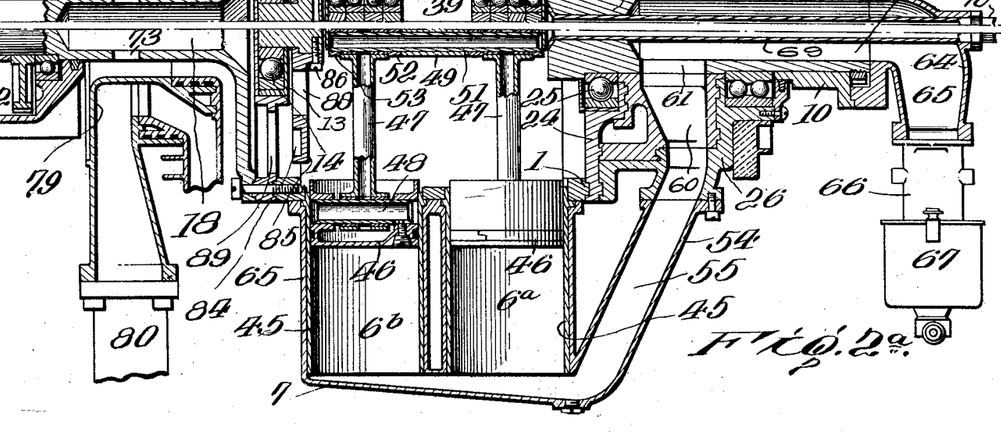
Figure 3:
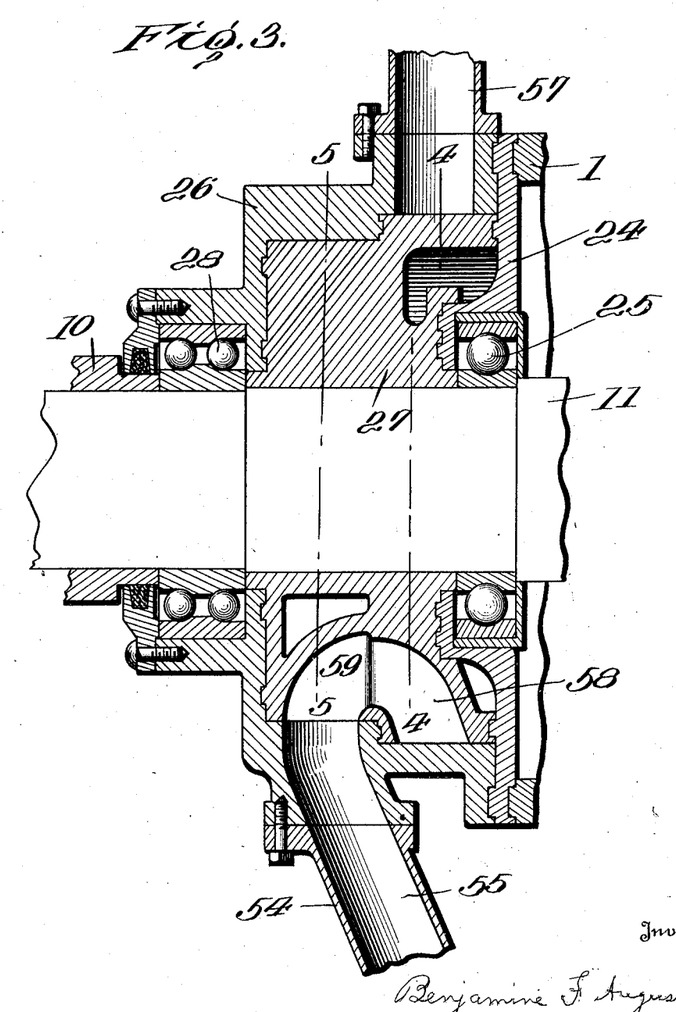
Fig. 3 is a vertical sectional view through the valve disk and the parts immediately associated therewith.

The engine cylinders as above noted, are arranged in pairs as shown at 2$^a$ and 2$^b$ in Fig. 2 of the drawings. These cylinders are preferably case en bloc, but they are spaced from each other so as to permit air to pass between the cylinders. The engine is air cooled, and to aid in cooling the cylinders, there are fins 29 between the cylinders and also laterally extending fins 30 all about the cylinders. The cylinder 2$^a$ is provided with intake ports 31, while the cylinders 2$^b$ are provided with exhaust ports 32. In the cylinder 2$^a$ is a piston 33, while in the cylinder 2$^b$ there is a piston 34. The pistons are each attached to a connecting rod 35. A piston pin 36 secures the connecting rod to the piston. The engine cylinders are similarly constructed as to their piston rod connection. On the crank 12 there are a series of rings 37. There is a pair of rings for each pair of cylinders, and these rings are spaced and cooperate with ball bearings on the main shaft. A cross bar 38 connects the spaced rings.

Figure 9:
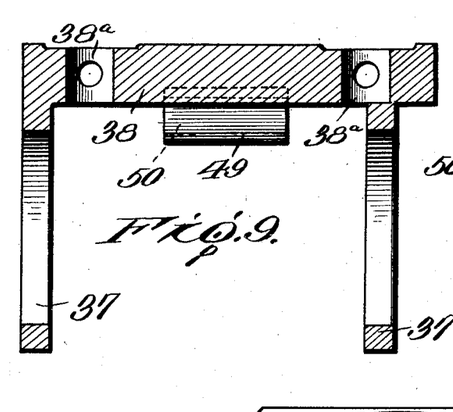
Fig. 9 is a detail showing one of the connecting bars and rings associated therewith to which the connecting rods are attached.
Figure 10:
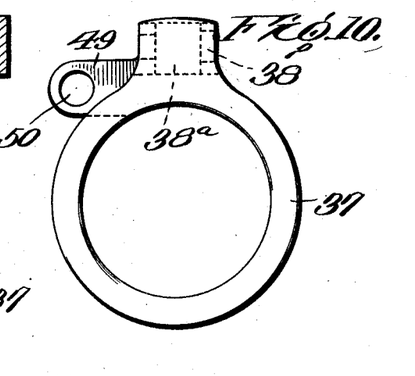
Fig. 10 is a side view of the same.

In Figures 9 and 10, I have shown the cross bar and connecting rings for one pair of cylinders. The rings for this pair of cylinders are arranged similar to those in connection with the cylinders shown in Fig. 2. The two rings 37 are connected by the bar 38. It will be understood that the other rings which support the pairs to which the connecting rods are attached are nested with each other and with the rings 37 as clearly shown in Fig. 2. This makes a very strong and durable connection between the crank and the connecting rods. The rings are slightly smaller in diameter than the space within the connecting bars 38 so that the rings are free from the bars and the end thrusts of the connecting rods on the cross bars 38 will be taken directly by the rings which are integrally formed therewith and which bear against the ball bearings on the crank. The rings are held spaced by means of a sleeve 39. The end of the crank 13 is made removable so as to facilitate the assembling of these rings and is shaped so as to hold the rings against a shoulder on the crank when the parts are assembled. End plates 40 and 41 serve to house in the rings.

Each of the cross bars 38 is provided with openings 38ª extending therethrough which receive the ends of the respective connecting rods and after the ends of the rods have been placed in these openings, a pin 42 is driven into the opening and into a hole in the connecting rod. A nut 43 threaded on the connecting rod is turned down against the end of the cross bar 38 and this serves as a very simple way of locking the connecting rods to the cross bar. When it is desired to remove the piston or connecting rod, all that is necessary is to disconnect and remove the cylinders containing the same from the crank casing, and this will expose the pistons and connecting rods. The nuts 43 can be readily loosened, the pins 42 driven out, and the connecting rods disconnected from the cross bar 38. In each cylinder there is a sleeve lining 44. The cylinders are preferably cast of some light metal, but these sleeve linings are preferably of cast iron as they afford a much better surface for the pistons to cooperate with.

The pump cylinders as above noted, are also arranged in pairs as indicated at 6ª and 6ᵇ in Figure 2ª of the drawings. These pump cylinders are likewise provided with sleeve linings 45. In each pump cylinder there is a piston 46 and associated with each piston is a connecting rod 47. The connecting rod is secured to the piston by means of a piston pin 48. These connecting rods for the pump pistons are connected to the cross bars 38 to which the connecting rods of the engine pistons are attached. As clearly shown in Figures 9 and 10, the cross bar 38 is provided with a laterally projecting lug 49. This lug 49 extends laterally from the cross bar and is provided with a suitable opening 50 which is adapted to receive a connecting pin 51. The connecting pin is in the form of a hollow sleeve and said hollow pin sleeve fits within the lug 49. The connecting rods are formed with sleeve bearings which engage these connecting pins and collars 52 and 53 prevent side play of the connecting rods. It will be clear from Fig. 1 of the drawing that as the engine casing rotates, the pump pistons will be reciprocated through the attachment of the connecting rods therefor to the cross bar with which the engine pistons cooperate. It is understood, of course, that each pair of pump pistons will be connected to a different cross bar, the pump pistons in one pair of pump cylinders being associated with the engine cylinders in rear thereof as the engine rotates. The pump cylinders are cast en bloc and also preferably cast integral therewith is an extension 54 which is provided with a passage 55 through which the fuel gases are drawn into and discharged from the pump cylinders on alternate strokes of the pistons. This extension 54 is connected to the extension 26 formed as a part of the crank casing.

Attached to each pair of engine cylinders is a connection 56 which is provided with a passage 57 for the intake of the fuel gases. The connection 56 is secured to the engine cylinder at one end, and at the other end to the extension 26. Located within the extension 26, as above noted, is the valve disk 27. This valve disk 27 is stationary, while the extension 26, together with the connection 56, rotate about the same. The extension 26 has a passage in alinement with the passage 57. The valve disk 27 and extension 26 are shown in detail in Figures 4 and 5. As will be clear from Fig. 4, the intake passages 57 formed in the extension 26 are symmetrically disposed about the center of rotation, which of course, is the center of the valve disk 27. The extensions 54 leading to the pump cylinders are also each connected to the extension 26 as has been stated, and the passage 55 extends through extension 26 as clearly shown in Fig. 5. These passages 55 are symmetrically disposed and are located intermediate the passages 57.

The valve disk 27 is provided with a port 58 which extends to the outer surface of the disk and part way in toward the center thereof, and lies in the plane of rotation of the intake passages 57 so that said intake passages will be connected one after another with this segmental intake port 58. Directly in rear of this segmental port 58 and in the plane of rotation of the fuel supply ports 55 leading to the pump, is another segmental port 59 which is shown in Fig. 5, and partly in dotted lines in Fig. 4. This port 59 in the plane of rotation of the passages 55 is open to the outer surface of the disk and is thus connected with the pump supply passages 55. The port 59 is sufficiently long as to be connected with two pump supply passages 55 at the same time. Likewise, the port 58 is sufficiently long so as to connect for a short time two cylinders. In other words, before the cylinder connected with one of the passages 57 has quite left the port 58, the other cylinder is connected thereto so that at the initial opening of a port leading to a cylinder, two cylinders are being supplied with fuel gas, and this reduces to a certain extent the amount entering the initially opening cylinder which leads to efficient scavenging without overrunning of the fuel supply gases. It will be noted that the pumps not only operate in succession, but certain of the pumps operate in conjunction to supply fuel gas to the cylinder at the time when it is receiving the main portion of its charge, and this enables the cylinder to be quickly supplied with a large volume of gas and a super-charge.

The pumps receive their supply of fuel gas from a supply port 60 formed in the controlling disk 27. This port 60 connects with ports 61 and 62 formed in the shaft 11. The port 60 is sufficiently long so that the pumps are drawing in a charge during the greater portion of the outward movement of the pistons. While it is true that the cylinders move instead of the pistons, the effect is the same as though the pistons move in the cylinders and they have been so referred to.

Figure 6:
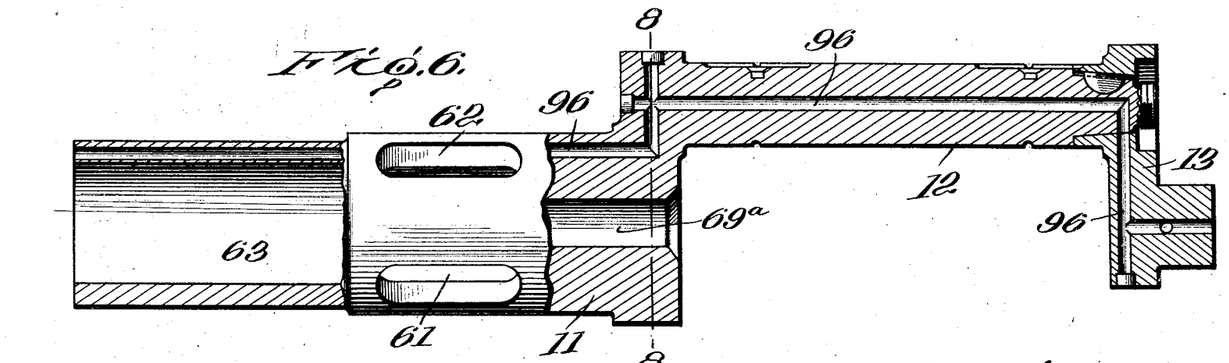
Fig. 6 is a longitudinal sectional view through the stationary shaft and crank.
Figure 7:
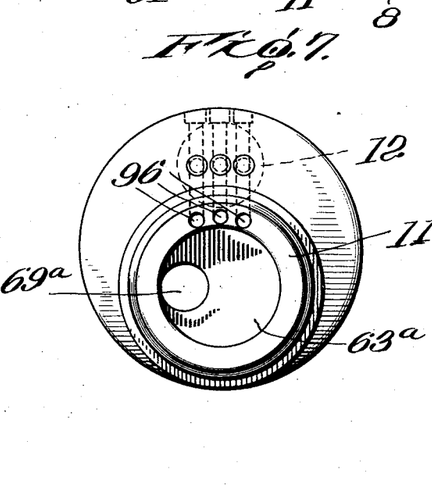
Fig. 7 is an end view of the same.
Figure 8:
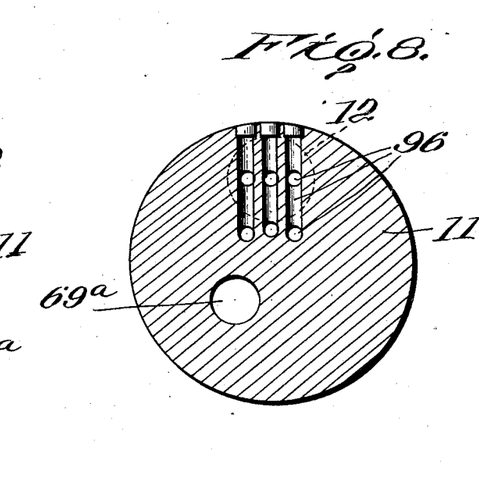
Fig. 8 is a sectional view on the line 8—8 of Fig. 6.

The stationary shaft 11 is formed with a recess 63 which extends longitudinally of the shaft and terminates short of the inner end of the shaft. As above noted, the shaft 11 is stationary and secured to the outer end of this stationary shaft is an elbow connection 64 which is provided with a passage 65 leading to the recess 63. On the end of the elbow 64 is a connection 66 which leads to the carburetor 67. Located in this connection 66 is a throttle valve controlled by a lever 68 (see Fig. 1). An air pipe 69 extends lengthwise of the shaft 11 at one side of the center of the recess 63 and this air pipe 69 is connected to the air pipe 70, which in turn is attached to the connection 66 leading to the carburetor. An auxiliary air port 71 is formed in the pipe 70 and a choke valve in the air pipe is controlled by a lever 72. The air pipe 69 extends through opening 69ª and at its inner end opens into the crank casing, so that air may be taken from the crank casing to the carburetor. See Fig. 6. The shaft 17 is formed with the recess at 18 and openings 73 lead through the shaft into this recess 18. Air may be drawn in through these openings 73 and pass from the recess 18 into the crank casing, through the crank casing and into the pipe 69 and thus to the carburetor. The exhaust pipes 74 are adjacent the opening 73 so that the air being drawn into the engine will be heated somewhat by the exhaust. It will be further heated by the internal heat of the engine, and so the air in the pipe 69 which is thus heated will aid in the volatilizing of the fuel gases passing through the recess 63 from the carburetor. This heated air also passes into the carburetor and further aids in forming a thoroughly volatile mixture.

Figures 13, 14:
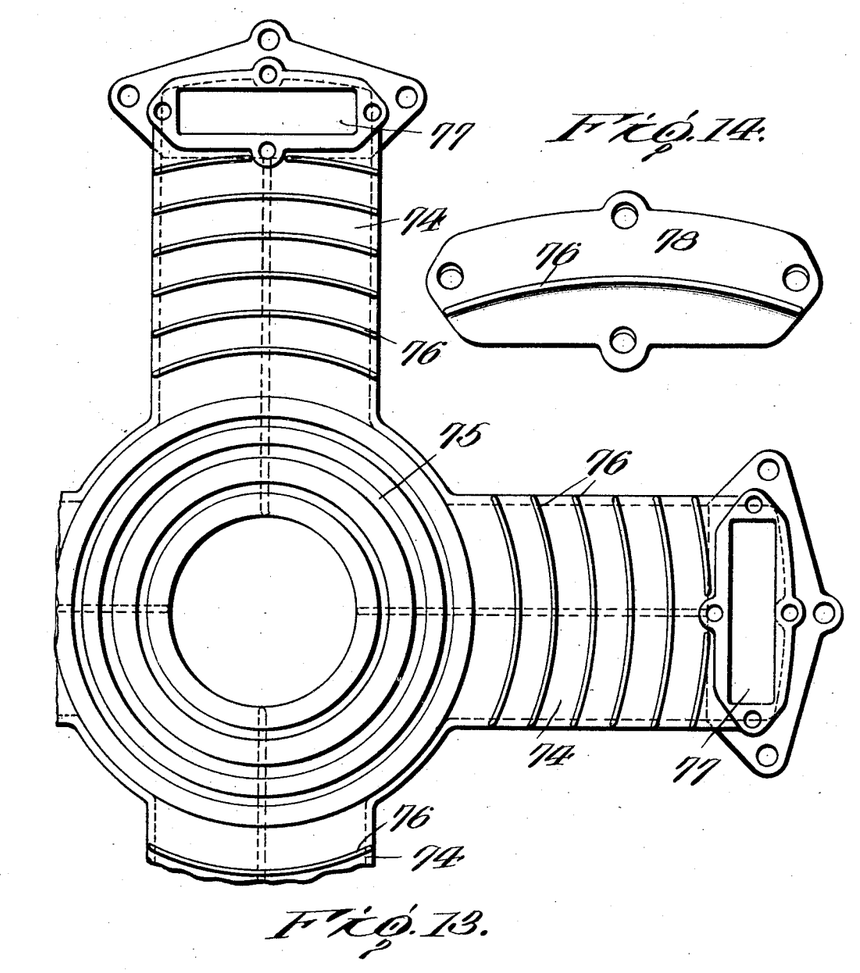
Fig. 13 is a view showing the arrangement of the exhaust pipes.
Fig. 14 is a detail showing the cover plate for the opening through the exhaust pipe.

Each pair of cylinders is provided with exhaust ports 32 so disposed as to be uncovered by the pistons. Attached to the engine cylinders are exhaust pipes 74. These exhaust pipes as shown in Fig. 13, are radially arranged and are integrally connected by the member 75. See Figs. 13 and 14. Each one of the pipes is provided with radiating fins 76 so that the pipes may be air-cooled. The pipes are suitably bolted to the engine cylinders, and adjacent the attachment of the pipes to the engine cylinders there is a port hole 77 which is closed by a cover plate 78 which gives ready access to the exhaust port. The integral member 75 to which the exhaust ports are connected is in turn connected with a ring or cap plate 79 which is bolted to the frame 10. The main exhaust pipe 80 is connected with this plate 79.

Figure 11:
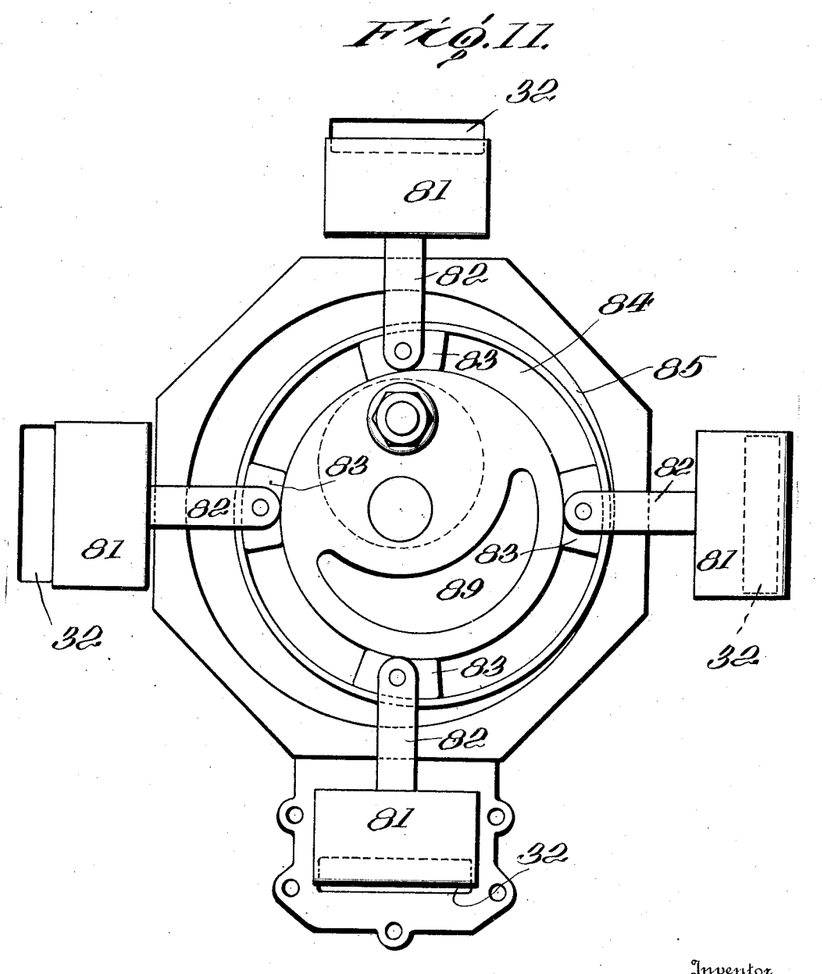
Fig. 11 is a view in side elevation showing the exhaust port controlling slides and the devices for operating the same.
Figure 12:
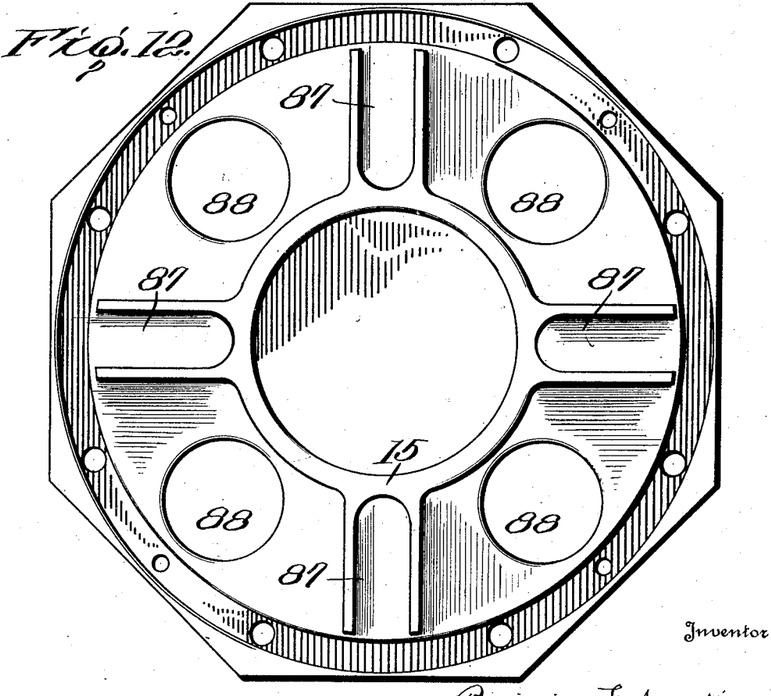
Fig. 12 is a detail in side elevation showing the supporting disk for one end of the crank casing and the guiding means carried thereby for the exhaust port slides.

As an auxiliary means for controlling the main exhaust ports, slides 81 are provided. These slides are shown more clearly in Fig. 11 of the drawings. Attached to each slide 81 is a stem 82 which in turn is pivoted to a shoe 83 which runs in an eccentric groove 84 formed in a disk 85. The disk 85 is fixed to the crank 12 by suitable bolts 86, so that as the cylinders rotate, the shoes 83 attached to the stems will follow around in the eccentric groove and thus move the exhaust port valve slides in and out relative to the center of the engine. These stems 82 are guided in recesses 87 formed in the disk 15 which supports the crank casing on the ball bearing 14 (see Fig. 12). The eccentric groove controlling the exhaust port slides is so shaped that the exhaust ports will be closed by these slides before they are closed by the piston, and this is for the purpose of preventing the fuel gases from overrunning. The slides move to uncover the exhaust ports before said exhaust ports are uncovered by the pistons, so that as soon as the piston uncovers the exhaust port, the burnt gases are released and the scavenging may commence at once.

Figure 4:
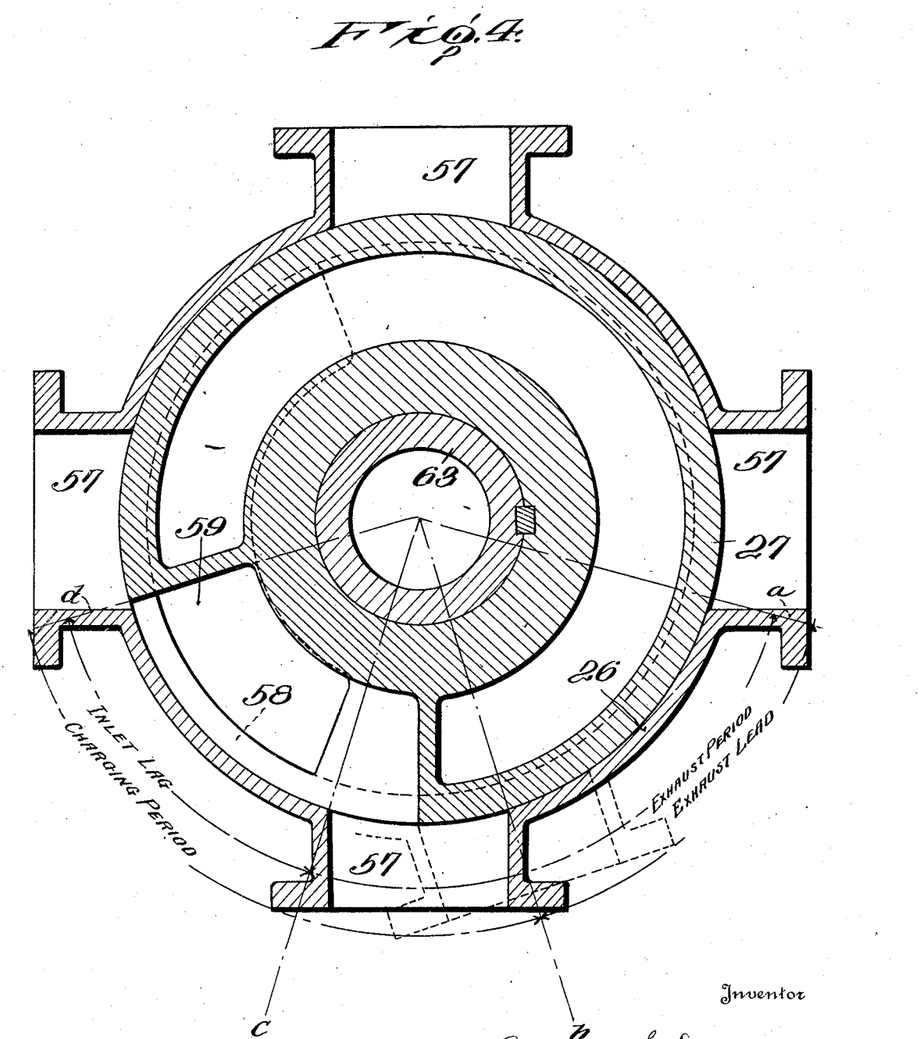
Fig. 4 is a sectional view on the line 4—4 of Fig. 3.
Figure 5:
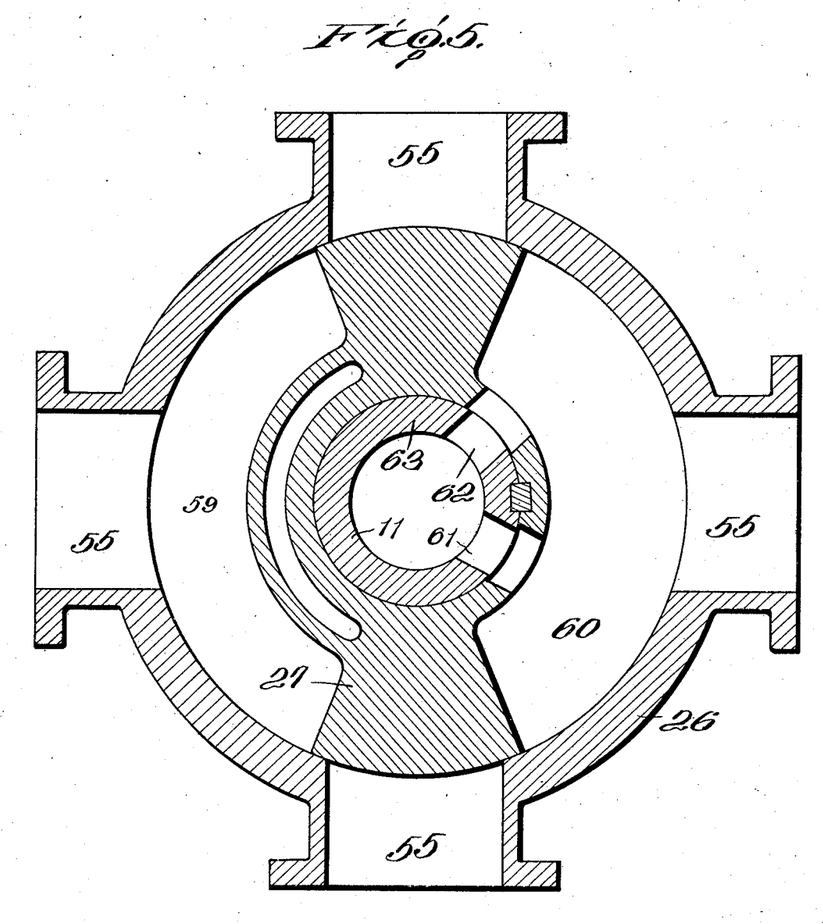
Fig. 5 is a sectional view on the line 5—5 of Fig. 3.

In Fig. 4 of the drawings has been indicated by arrows the exhaust period and the exhaust lead; also a charging period and the intake lag. In other words, when the engine cylinder reaches the radial line a the exhaust port is uncovered by the piston so that the exhaust takes place, and this exhaust port remains uncovered until the line $b$ is reached, or about ninety degrees of movement of the engine cylinders. At the line $b$ the exhaust port valve slide moves up so as to cover the exhaust port, as clearly shown in Fig. 11 of the drawings. Before the exhaust port is closed, however, the charging period begins so that some of the fuel gas entering will aid in the complete scavenging of the cylinders. When the line $c$ is reached, the valve disk connects up the fuel supply with the cylinder, and between the lines $c$ and $b$ there is a small amount of fuel gas entering which scavenges the cylinder as above stated. At the line $b$, the exhaust port is closed by an exhaust port valve slide, and the charging continues until the line $d$ is reached, when the port 57 leading to the cylinder is cut off by the valve disk. So as a matter of fact, it is the valve disk 27 that connects the cylinder to the supply and cuts off the cylinder from its supply. This cut off of the cylinder from its supply is however, timed as to take advantage of the full opening time of the intake port. As already has been explained, when intake port of a cylinder is initially opened, an advance cylinder is receiving its final charge (see dotted line position, Fig. 4) so that the amount of gas passing into the cylinder at its initial opening is relatively small. Certain pumps however, operate in succession and in conjunction to supply the fuel charge to the cylinder so that a relatively large volume of gas may be passed into the cylinder and the super-charge secured.

The disk 15 is provided with openings 89, and the disk 85 is also provided with an opening 88. These openings 88 and 89 permit a free passage of the air from in and about the exhaust pipes through the opening 73 into the recess 18 and thence through into the crank casing, and from the crank casing into the air pipe 69 and to the carburetor.

Figure 1:
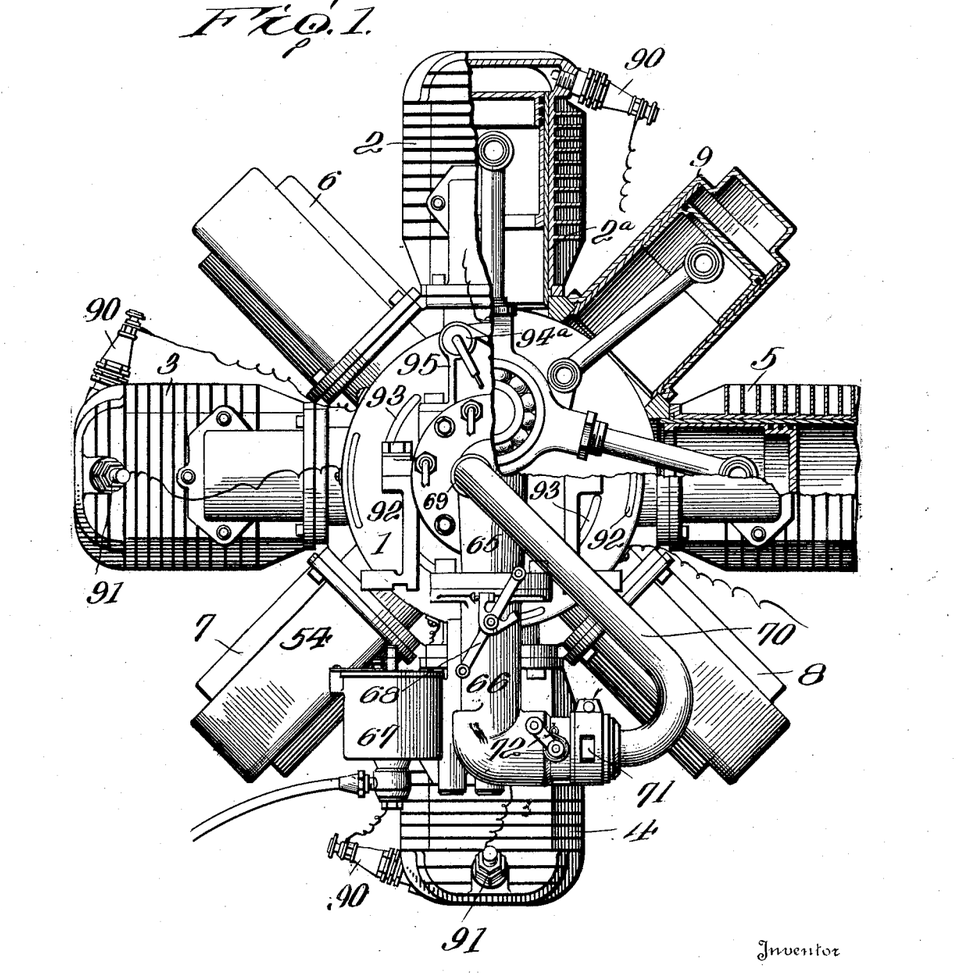
Figure 1 is a view partly in section and partly in end elevation showing an engine embodying the improvements.

Each pair of cylinders is provided with two spark plugs 90 and 91 (see Fig. 1). The spark plugs 91 are connected with suitable comutator plates 92, while the spark plugs 90 are connected with suitable commutator plates 93. There is a brush 94 which is adapted to cooperate with the commutator plates 93, and a similar brush 94ª which is adapted to cooperate with the commutator plate 92. These brushes are mounted in a bracket 95 suitably secured to the frame 10.

Lubricating oil is supplied from a suitable force feed to ports 96 which lead to the bearings and parts which should be lubricated.

It is believed the operation of my device will be obvious from the above description. Assuming the parts are in the position shown in Fig. 1, the pistons of the engine 2 have compressed the gases, and when these gases are ignited, the expansion of the gases will force the cylinders outward, the pistons becoming an abutment therefor, and this causes the crank casing to rotate in a counter clockwise direction (see Fig. 1). When the cylinder has reached the position indicated at $a$ in Fig. 4, then the piston 33 of the left-hand cylinder as viewed in Fig. 2 will uncover the exhaust port and the burnt gases will be released. At or about the same time, the piston in the other cylinder will uncover the intake port, but the valve disk 27 will prevent any burnt gases from passing back through the passage 57 into the supply and thus backfire it. As the cylinders continue to rotate, the intake port 57 will reach and make connection with the port 58 in the valve disk 27, and a certain amount of the fuel gas will rush into the cylinder, the exhaust port still being open, to finally scavenge the cylinder. When the port $b$ is reached, the exhaust port is covered by the valve slide, so that the fuel gas will be trapped in the cylinders, and a supercharge supplied without any overrunning or waste of the fuel gases when operating under full load. When the line $d$ is reached, the valve disk cuts off the supply of gases and compression of the gas begins.

As to the pumps, when the crank casing reaches a position so that the port 55 connects with the port 60, then fuel will be drawn in by the pump pistons and this continues until the pump piston has reached its full stroke. On reverse movement of the pump piston, the port 55 is connected with the port 59 and the supply of fuel taken into the pump is forced back into the port 59, and from the port 59 to the port 58 and thence to the engine cylinders. The port 59 is of sufficient length so that two pumps may be delivering thereto at the same time, and this port 59 is so positioned that two pumps operate to supply the cylinders with their main charge. The pump pistons are also operated from the same crank connection as the engine cylinders, and this greatly simplifies the structure of the engine.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. In a hydro-carbon engine, the combination of a rotating casing, a plurality of pairs of connected engine cylinders radially disposed and carried by said casing, pistons in said cylinders, intake and exhaust ports disposed so as to be covered and uncovered by said pistons, means including pipes and a control valve for supplying a fuel charge directly to each pair of cylinders in turn, and means located between the fuel supply means and the intake port for closing the passage leading to the intake port when said intake port is initially uncovered by the piston.

2. In a hydro-carbon engine, the combination of a rotating casing, a plurality of pairs of connected engine cylinders radially disposed and carried by said casing, pistons in said cylinders, intake and exhaust ports disposed so as to be covered and uncovered by said pistons, means including pipes and a control valve for supplying a fuel charge directly to each pair of cylinders in turn, means located between the fuel supply means and the intake port for closing the passage leading to the intake port when said intake port is initially uncovered by the piston, a slide for covering the exhaust port independently of the piston, and means for operating said slide so as to cover said exhaust port in advance of the covering of the same by the piston.

3. In a hydro-carbon engine, the combination of a rotating casing, a plurality of pairs of connected engine cylinders radially disposed and carried by said casing, pistons in said cylinders, intake and exhaust ports disposed so as to be covered and uncovered by said pistons, means for supplying a fuel charge to each pair of cylinders in turn, means located between the fuel supply means and the intake port for closing the passage leading to the intake port when said intake port is initially uncovered by the piston, a slide for covering the exhaust port independently of the piston, means for operating said slide so as to cover said exhaust port in advance of the covering of the same by the piston, said intake port controlling means being constructed so as to permit the entering of a small amount of fuel mixture prior to the closing of the exhaust port by said slide.

4. In a hydro-carbon engine, the combination of a rotating casing, a plurality of radially disposed connecting pairs of cylinders carried thereby, a plurality of pump cylinders associated with the engine cylinders for transmitting a charge of fuel mixture directly to the engine cylinders in succession, each pair of cylinders having intake and exhaust ports adapted to be covered and uncovered by the pistons in the cylinders, a valve disk located between the pumps and the intake port for closing the passage leading to the intake port upon the initial opening of the intake port by the piston and for subsequently connecting said pumps to the intake port.

5. In a hydro-carbon engine, the combination of a rotating casing, a plurality of radially disposed connecting pairs of cylinders carried thereby, a plurality of pump cylinders associated with the engine cylinders for transmitting a charge of fuel mixture directly to the engine cylinders in succession, each pair of cylinders having intake and exhaust ports adapted to be covered and uncovered by the pistons in the cylinders, a valve disk located between the pumps and the intake port for closing the passage leading to the intake port upon the initial opening of the intake port by the piston and for subsequently connecting said pumps to the intake port, a slide for covering the exhaust ports independently of the piston, said slide being timed so as to close the exhaust ports prior to the closing of the same by the piston.

6. In a hydro-carbon engine, the combination of a rotating casing, a plurality of radially disposed connecting pairs of cylinders carried thereby, a plurality of pump cylinders associated with the engine cylinders for transmitting a charge of fuel mixture to the engine cylinders in succession, each pair of cylinders having intake and exhaust ports adapted to be covered and uncovered by the pistons in the cylinders, a valve disk located between the pumps and the intake port for closing the passage leading to the intake port upon the initial opening of the intake port by the piston and for subsequently connecting said pumps to the intake port, a slide for covering the exhaust ports independently of the piston, said slide being timed so as to close the exhaust ports prior to the closing of the same by the piston, said valve disk being constructed so as to admit a portion of the fuel mixture to the engine cylinders prior to the closing of the exhaust ports.

7. In a hydro-carbon engine, the combination of a rotating casing, a plurality of radially disposed connecting pairs of cylinders carried thereby, a plurality of pump cylinders associated with the engine cylinders for transmitting a charge of fuel mixture to the engine cylinders in succession, each pair of cylinders having intake and exhaust ports adapted to be covered and uncovered by the pistons in the cylinders, a valve disk located between the pumps and the intake port for closing the passage leading to the intake port upon the initial opening of the intake port by the piston and for subsequently connecting said pumps to the intake port, a slide for covering the exhaust ports independently of the piston, said slide being timed so as to close the exhaust ports prior to the closing of the same by the piston, said controlling disk being constructed so as to admit a portion of the fuel mixture to the engine cylinders prior to the closing of the exhaust ports, said valve disk being also constructed so as to connect a plurality of pumps to each cylinder during the charging period whereby said pumps may operate in conjunction to supply the fuel mixture charge to the cylinders.

8. In a hydro-carbon engine, the combination of a rotating casing, a plurality of pairs of connected radially disposed engine cylinders, a piston in each cylinder, said cylinders having intake and exhaust ports covered and uncovered by the pistons, said pairs of cylinders being disposed so as to rotate in the same plane, a plurality of pairs of connected pump cylinders located in the same plane of rotation as the engine cylinders and intermediate the same, a piston in each pump cylinder, a valve disk between the pump cylinders and the engine cylinders and also between the pump cylinders and the source of supply of fuel mixture, said valve disk operating to connect said pump cylinders to the source of supply during the intake period thereof and to close said pump cylinders to the source of supply during the expelling period thereof, said controlling disk also operating to close the passage leading to the intake port during the initial opening of the intake port by the piston and to connect said intake port to the pumps during the charging period.

9. In a hydro-carbon engine, the combination of a rotating casing, a plurality of pairs of connected radially disposed engine cylinders, a piston in each cylinder, said cylinders having intake and exhaust ports covered and uncovered by the pistons, said pairs of cylinders being disposed so as to rotate in the same plane, a plurality of pairs of connected pump cylinders located in the same plane of rotation as the engine cylinders and intermediate the same, a piston in each pump cylinder, a valve disk between the pump cylinders and the engine cylinders and also between the pump cylinders and the source of supply of fuel mixture, said valve disk operating to connect said pump cylinders to the source of supply during the intake period thereof and to close said pump cylinders to the source of supply during the expelling period thereof, said valve disk also operating to close the passage leading to the intake port during the initial opening of the intake port by the piston and to connect said intake port to the pumps during the charging period, the ports in the valve disk being constructed so as to connect a plurality of pumps to the engine cylinder at the same time whereby said pumps operate in conjunction to quickly supply a large amount of fuel mixture to the engine cylinders and provide a super-charge for the engine cylinders.

10. In a hydro-carbon engine, the combination of a rotating casing, a plurality of pairs of connected radially disposed engine cylinders, a piston in each cylinder, said cylinders having intake and exhaust ports covered and uncovered by the pistons, said pairs of cylinders being disposed so as to rotate in the same plane, a plurality of pairs of connected pump cylinders located in the same plane of rotation as the engine cylinders and intermediate the same, a piston in each pump cylinder, a valve disk between the pump cylinders and the engine cylinders and also between the pump cylinders and the source of supply of fuel mixture, said valve disk operating to connect said pump cylinders to the source of supply during the intake period thereof and to close said pump cylinders to the source of supply during the expelling period thereof, said valve disk also operating to close the passage leading to the intake port during the initial opening of the intake port by the piston and to connect said intake port to the pumps during the charging period, the ports in the valve disk being constructed so as to connect a plurality of pumps to the engine cylinder at the same time whereby said pumps operate in conjunction to quickly supply a large amount of fuel mixture to the engine cylinders and provide a super-charge for the engine cylinders, a slide for covering the exhaust port independent of the piston associated therewith, and means for operating said slide so as to cover the exhaust port prior to the covering of the same by the piston.

11. In a hydrocarbon engine, a rotating casing, a plurality of radially disposed cylinders carried by the casing, said cylinders operating in succession, a plurality of radially disposed pumps carried by said casing and operating in succession, means for directly connecting said pumps to said cylinders including a valve disk disposed in the passages intermediate the ends of the cylinders and the pumps, said disks being constructed so as to connect the plurality of pumps directly to each cylinder in turn, whereby said pumps operate in conjunction to transmit a charge of fuel mixture directly to each cylinder.

In testimony whereof, I affix my signature.

BENJAMIN FRANKLIN AUGUSTINE.